(12) United States Patent
Fleming et al.

(10) Patent No.: US 10,910,680 B2
(45) Date of Patent: Feb. 2, 2021

(54) BATTERY THERMAL MANAGEMENT SYSTEM INCLUDING THERMOELECTRIC DEVICE

(71) Applicant: FORD GLOBAL TECHNOLOGIES, LLC, Dearborn, MI (US)

(72) Inventors: Matthew Fleming, Dearborn, MI (US); Erik J. Christen, Royal Oak, MI (US); Ray C. Siciak, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1191 days.

(21) Appl. No.: 15/007,610

(22) Filed: Jan. 27, 2016

(65) Prior Publication Data

US 2017/0214099 A1   Jul. 27, 2017

(51) Int. Cl.
| | |
|---|---|
| *H01M 10/44* | (2006.01) |
| *H01M 10/6563* | (2014.01) |
| *B60L 53/10* | (2019.01) |
| *B60L 58/26* | (2019.01) |
| *H01M 10/635* | (2014.01) |
| *H01M 10/613* | (2014.01) |
| *H01M 10/625* | (2014.01) |
| *H01M 10/6556* | (2014.01) |
| *H01M 10/6568* | (2014.01) |
| *H01M 10/6572* | (2014.01) |
| *H01M 10/46* | (2006.01) |
| *H01M 10/0525* | (2010.01) |
| *H01M 10/663* | (2014.01) |
| *H01M 10/42* | (2006.01) |

(52) U.S. Cl.
CPC ........ *H01M 10/443* (2013.01); *B60L 53/11* (2019.02); *B60L 58/26* (2019.02); *H01M 10/46* (2013.01); *H01M 10/613* (2015.04); *H01M 10/625* (2015.04); *H01M 10/635* (2015.04); *H01M 10/6556* (2015.04); *H01M 10/6563* (2015.04); *H01M 10/6568* (2015.04); *H01M 10/6572* (2015.04); *H01M 10/0525* (2013.01); *H01M 10/663* (2015.04); *H01M 2010/4271* (2013.01); *H01M 2220/20* (2013.01); *Y02E 60/10* (2013.01)

(58) Field of Classification Search
CPC .......... H01M 10/443; H01M 10/6563; H01M 10/615; B60L 53/11
See application file for complete search history.

(56) References Cited

U.S. PATENT DOCUMENTS

| | | |
|---|---|---|
| 5,229,702 A | 7/1993 | Boehling et al. |
| 5,871,859 A | 2/1999 | Parise |
| 8,377,581 B2 | 2/2013 | Anderson et al. |
| 8,955,314 B2 | 2/2015 | Pegg et al. |

(Continued)

FOREIGN PATENT DOCUMENTS

| | | |
|---|---|---|
| KR | 1020130060758 A | 6/2013 |
| WO | 2013137612 A1 | 9/2013 |

*Primary Examiner* — Richard V Muralidar
(74) *Attorney, Agent, or Firm* — David B. Kelley; Carlson, Gaskey & Olds

(57) ABSTRACT

A battery thermal management system according to an exemplary aspect of the present disclosure includes, among other things, a battery pack, a coolant subsystem configured to cool the battery pack, and a thermoelectric device disposed within the coolant subsystem and selectively activated to augment cooling of the battery pack.

18 Claims, 5 Drawing Sheets

(56) References Cited

U.S. PATENT DOCUMENTS

| | | | |
|---|---|---|---|
| 2010/0112419 A1 | 5/2010 | Jang et al. | |
| 2011/0120146 A1* | 5/2011 | Ota | B60H 1/00885 62/3.3 |
| 2012/0043943 A1* | 2/2012 | Dyer | B60L 58/26 320/137 |
| 2012/0234518 A1* | 9/2012 | Brodie | F28D 20/028 165/104.31 |
| 2013/0029193 A1* | 1/2013 | Dyer | H01M 10/486 429/62 |
| 2013/0327063 A1 | 12/2013 | Gawthrop | |
| 2014/0099521 A1 | 4/2014 | Kim et al. | |
| 2015/0101789 A1* | 4/2015 | Enomoto | B60H 1/00485 165/202 |
| 2016/0181835 A1* | 6/2016 | Gross | H02J 7/0013 320/101 |
| 2016/0372806 A1* | 12/2016 | Lee | H01M 10/6572 |

\* cited by examiner

BATTERY THERMAL MANAGEMENT SYSTEM INCLUDING THERMOELECTRIC DEVICE

TECHNICAL FIELD

This disclosure relates to a battery thermal management system for an electrified vehicle. The battery thermal management system includes a thermoelectric device configured to augment cooling of the battery assembly during certain conditions.

BACKGROUND

The desire to reduce automotive fuel consumption and emissions is well documented. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

A high voltage battery pack typically powers the electric machines and other electrical loads of the electrified vehicle. The battery pack includes a plurality of battery cells that must be periodically recharged to replenish the energy necessary to power these loads. The battery cells generate heat, such as during charging and discharging operations. Battery thermal management systems are sometimes employed to manage the heat generated by the battery cells.

SUMMARY

A battery thermal management system according to an exemplary aspect of the present disclosure includes, among other things, a battery pack, a coolant subsystem configured to cool the battery pack, and a thermoelectric device disposed within the coolant subsystem and selectively activated to augment cooling of the battery pack.

In a further non-limiting embodiment of the foregoing system, the coolant subsystem includes a radiator, a first valve, a second valve, and a chiller loop that includes a chiller. The coolant subsystem is configured to circulate a coolant through an internal cooling circuit of the battery pack to remove heat generated by battery cells of the battery pack.

In a further non-limiting embodiment of either of the foregoing systems, a refrigerant subsystem circulates a refrigerant, the refrigerant exchanging heat with a coolant of the coolant subsystem within a chiller.

In a further non-limiting embodiment of any of the foregoing systems, the refrigerant subsystem includes a condenser.

In a further non-limiting embodiment of any of the foregoing systems, the coolant subsystem includes a pump configured to circulate a coolant through the coolant subsystem.

In a further non-limiting embodiment of any of the foregoing systems, the thermoelectric device is a Peltier device.

In a further non-limiting embodiment of any of the foregoing systems, the thermoelectric device includes a junction positioned between a cold side and a hot side, the cold side exposed to a coolant of the coolant subsystem to remove heat from the coolant.

In a further non-limiting embodiment of any of the foregoing systems, the thermoelectric device is powered by a charging port of a charging system.

In a further non-limiting embodiment of any of the foregoing systems, a DC/DC converter is between the charging port and the thermoelectric device.

In a further non-limiting embodiment of any of the foregoing systems, a control unit is configured to activate the thermoelectric device during DC fast charging events.

In a further non-limiting embodiment of any of the foregoing systems, a control unit is configured to activate the thermoelectric device if a temperature of the battery pack exceeds a temperature threshold.

In a further non-limiting embodiment of any of the foregoing systems, the thermoelectric device is positioned near an inlet of the battery pack.

In a further non-limiting embodiment of any of the foregoing systems, the thermoelectric device is positioned near an outlet of the battery pack.

In a further non-limiting embodiment of any of the foregoing systems, a fan is configured to blow air across a plurality of fins of the thermoelectric device.

In a further non-limiting embodiment of any of the foregoing systems, the thermoelectric device is positioned near an exit line of a chiller loop of the coolant subsystem.

A method according to another exemplary aspect of the present disclosure includes, among other things, activating a thermoelectric device to augment cooling of a battery pack of an electrified vehicle during a DC fast charging event.

In a further non-limiting embodiment of the foregoing methods, the method includes distributing a first portion of DC power to the battery pack during the DC fasting charging event and distributing a second portion of the DC power to power the thermoelectric device during the DC fast charging event.

In a further non-limiting embodiment of either of the foregoing methods, the method includes reducing a voltage of the second portion of the DC power prior to communicating the DC power to the thermoelectric device.

In a further non-limiting embodiment of any of the foregoing methods, the method includes continuing operation of the thermoelectric device after the DC fast charging event ends if an ambient temperature exceeds a threshold ambient temperature.

In a further non-limiting embodiment of any of the foregoing methods, the method includes monitoring a temperature of the battery pack, comparing the temperature to a temperature threshold and activating the thermoelectric device if the temperature exceeds the temperature threshold.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes a battery thermal management system for an electrified vehicle. The battery thermal management system includes a coolant subsystem for circulating coolant through a battery pack to cool the battery pack. In some embodiments, the coolant subsystem includes a thermoelectric device that is selectively activated to augment battery pack cooling. For example, cooling may be augmented during DC fast charging events or other high thermal load events. These and other features are discussed in greater detail in the following paragraphs of this detailed description.

Figure 1:
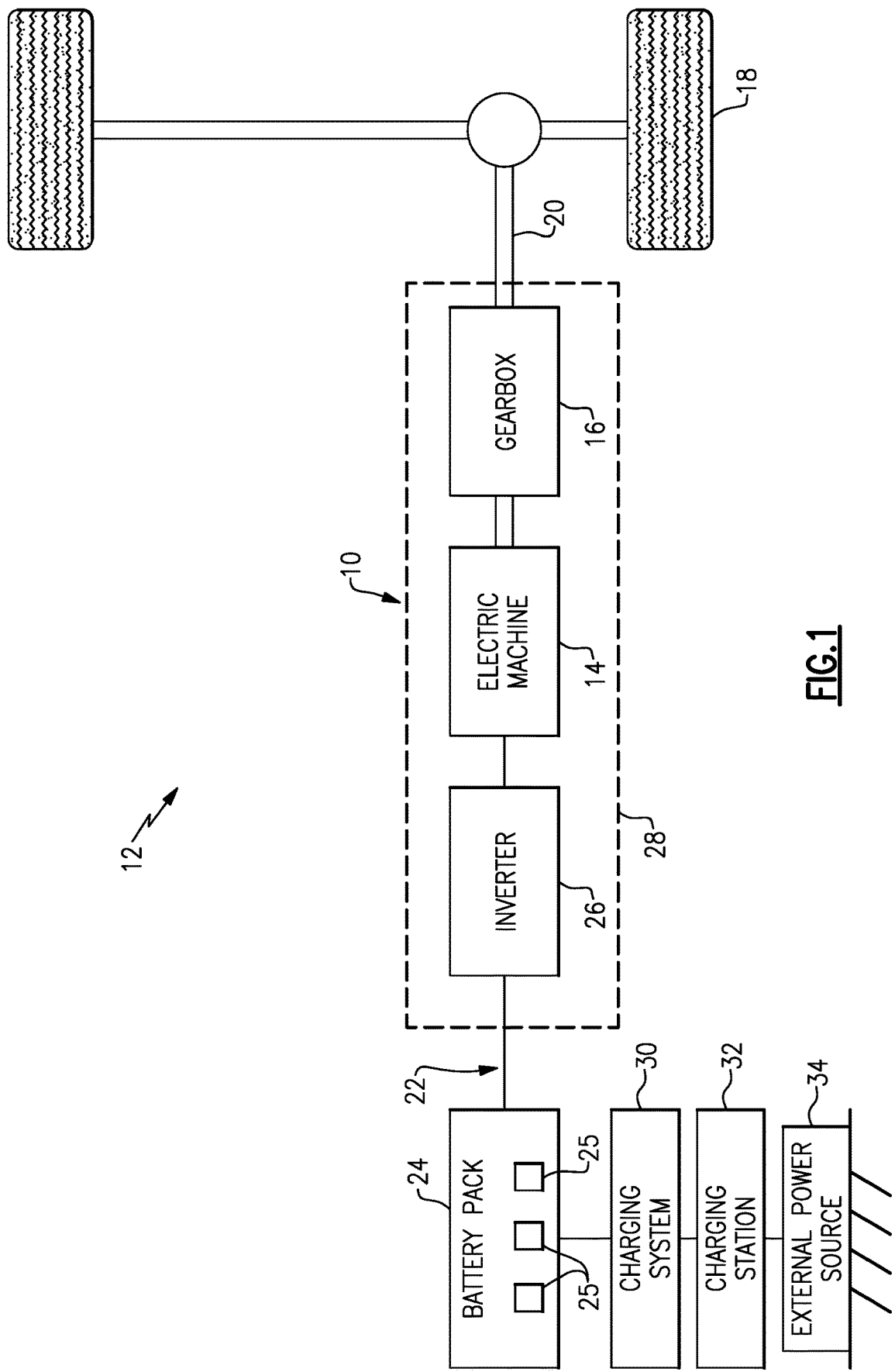
FIG. 1 schematically illustrates a powertrain of an electrified vehicle.

FIG. 1 schematically illustrates a powertrain 10 of an electrified vehicle 12. Although depicted as a battery electric vehicle (BEV), it should be understood that the concepts described herein are not limited to BEV's and could extend to other electrified vehicles, including but not limited to, plug-in hybrid electric vehicles (PHEV's). Therefore, although not shown in this embodiment, the electrified vehicle 12 could be equipped with an internal combustion engine that can be employed either alone or in combination with other energy sources to propel the electrified vehicle 12.

In one non-limiting embodiment, the electrified vehicle 12 is a full electric vehicle propelled solely through electric power, such as by an electric machine 14, without assistance from an internal combustion engine. The electric machine 14 receives electrical power and provides a rotational output power. The electric machine 14 may be connected to a gearbox 16 for adjusting the output torque and speed of the electric machine 14 by a predetermined gear ratio. The gearbox 16 is connected to a set of drive wheels 18 by an output shaft 20. A high voltage bus 22 electrically connects the electric machine 14 to a battery pack 24 through an inverter 26. The electric machine 14, the gearbox 16, and the inverter 26 are collectively referred to as a transaxle 28.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the electric machine 14 and/or other electrical loads of the electrified vehicle 12. Other types of energy storage devices and/or output devices can also be used to electrically power the electrified vehicle 12.

The electrified vehicle 12 may also include a charging system 30 for charging the energy storage devices (e.g., battery cells) of the battery pack 24. The charging system 30 receives and distributes power throughout the electrified vehicle 12. The charging system 30 may be equipped with power electronics used to convert AC power received from the external power supply to DC power for charging the energy storage devices of the battery pack 24. The charging system 30 may also accommodate one or more conventional voltage sources from an external power supply (e.g., 110 volt, 220 volt, direct current sources, etc.).

A vehicle charging station 32 can be connected to the electrified vehicle 12, via the charging system 30, to charge the battery pack 24. The vehicle charging station 32 is separate from the electrified vehicle 12. In one non-limiting embodiment, the vehicle charging station 32 is configured to perform DC fast charging of the battery pack 24. DC fast charging events are short duration, rapid charge events that typically last approximately thirty minutes or less. The vehicle charging station 32 employs DC fast charging by delivering direct current (DC) at power rates between approximately 50 A and 500 A at between 200 V and 600 V to rapidly charge the battery pack 24, as opposed to the typical 4 A to 15 A output of standard alternating current (AC) chargers.

The vehicle charging station 32 is powered by an external power source 34 (shown schematically). In one non-limiting embodiment, the external power source 34 is utility grid power. In another non-limiting embodiment, the external power source 34 includes an alternative energy source, such as solar power, wind power, etc. In yet another non-limiting embodiment, the external power source 34 includes a combination of utility grid power and alternative energy sources.

The powertrain 10 shown in FIG. 1 is highly schematic and is not intended to limit this disclosure. Various additional components could alternatively or additionally be employed by the powertrain 10 within the scope of this disclosure.

Figure 2:
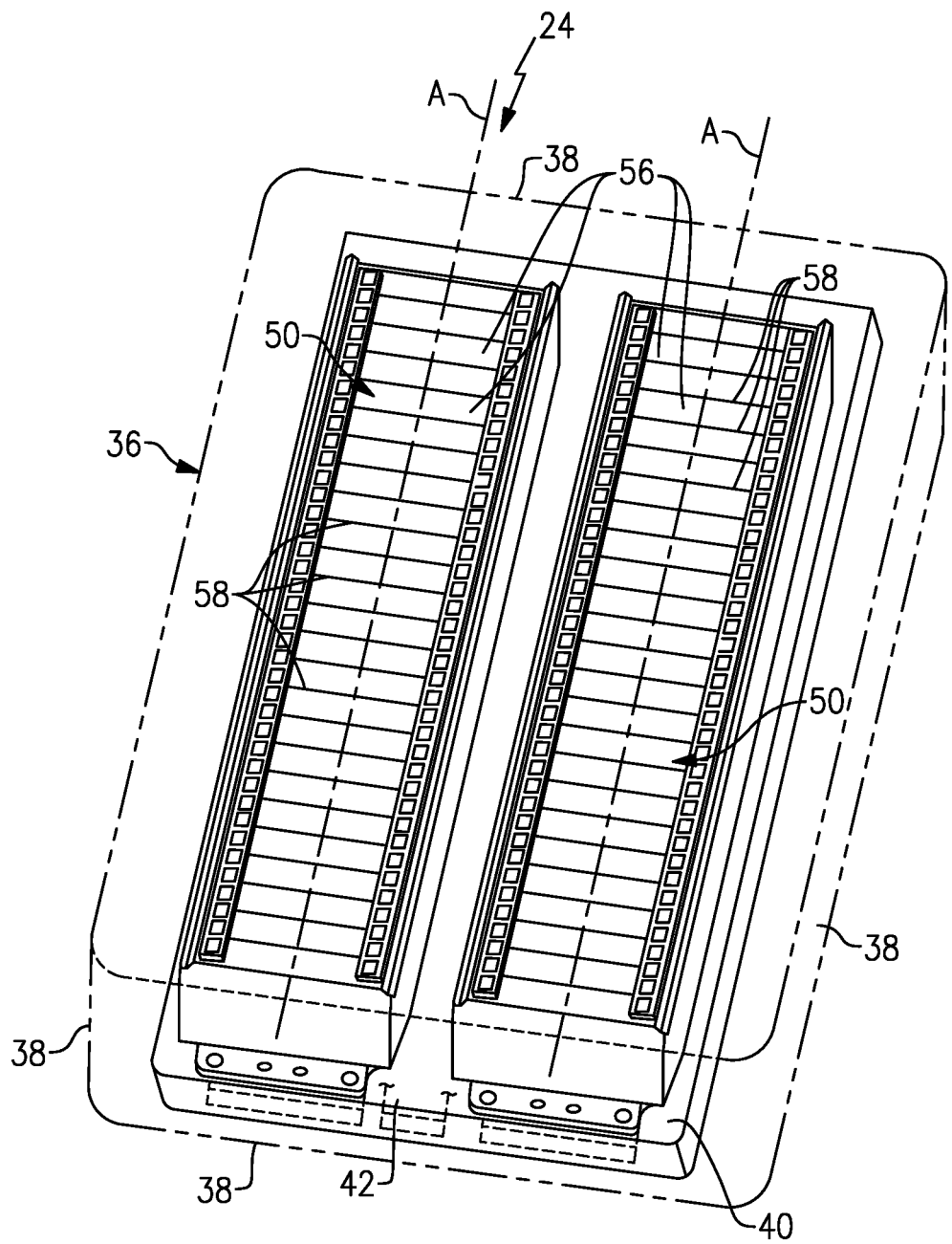
FIG. 2 illustrates a battery pack of an electrified vehicle.

Referring now to FIG. 2, the battery pack 24 includes a plurality of battery cells 56 for supplying electrical power to various electrical loads of the electrified vehicle 12. Although a specific number of battery cells 56 are depicted in FIG. 2, the battery pack 24 could employ a fewer or greater number of battery cells within the scope of this disclosure. In other words, this disclosure is not limited to the specific configuration shown in FIG. 2. The battery cells 56 may be stacked side-by-side along a longitudinal axis A to construct a grouping of battery cells 56, sometimes referred to as a "cell stack." In one non-limiting embodiment, the battery pack 24 includes two separate groupings of battery cells 56 (i.e., two cell stacks).

In another non-limiting embodiment, the battery cells 56 are prismatic, lithium-ion cells. However, battery cells having other geometries (cylindrical, pouch, etc.), other chemistries (nickel-metal hydride, lead-acid, etc.), or both, could alternatively be utilized within the scope of this disclosure.

In yet another non-limiting embodiment, spacers 58, which are sometimes referred to as separators or dividers, are positioned between adjacent battery cells 56 of each grouping of battery cells 56. The spacers 58 can include thermally resistant and electrically isolating plastics and/or foams. The battery cells 56 and the spacers 58, along with any other support structures (e.g., rails, walls, plates, etc.), may collectively be referred to as a battery array 50. Two battery arrays 50 are shown in FIG. 2; however, the battery pack 24 could include only a single battery array or greater than two battery arrays.

An enclosure 36 generally surrounds the battery arrays 50 of the battery pack 24. The enclosure 36 includes a plurality of walls 38 arranged to substantially enclose the battery arrays 50.

Each battery array 50 is positioned relative to a heat exchanger plate 40, sometimes referred to as a cold plate. Other heat exchanges may alternatively be used. The heat exchanger plate 40 is configured to conduct heat out of the battery cells 56. In other words, the heat exchanger plate 40 acts as a heat sync to remove heat from the heat sources (i.e., the battery cells 56). In one non-limiting embodiment, the heat exchanger plate 40 includes an internal cooling circuit 42 for circulating a fluid, such as coolant, to thermally condition the battery cells 56 of the battery pack 24. This disclosure is not limited to the specific cooling circuit configuration shown in FIG. 2. That is, the internal cooling circuit 42 may embody any size, shape or configuration for circulating fluid through the heat exchanger plate 40 to remove thermal energy from the battery cells 56.

During certain conditions, such as during DC fast charging events, a significant amount of heat can be generated by the battery cells 56. It is desirable to manage this heat to improve capacity and life of the battery cells 56 and therefore improve the efficiency of the battery pack 24. Systems and techniques for actively managing this heat are therefore detailed below.

Figure 3:
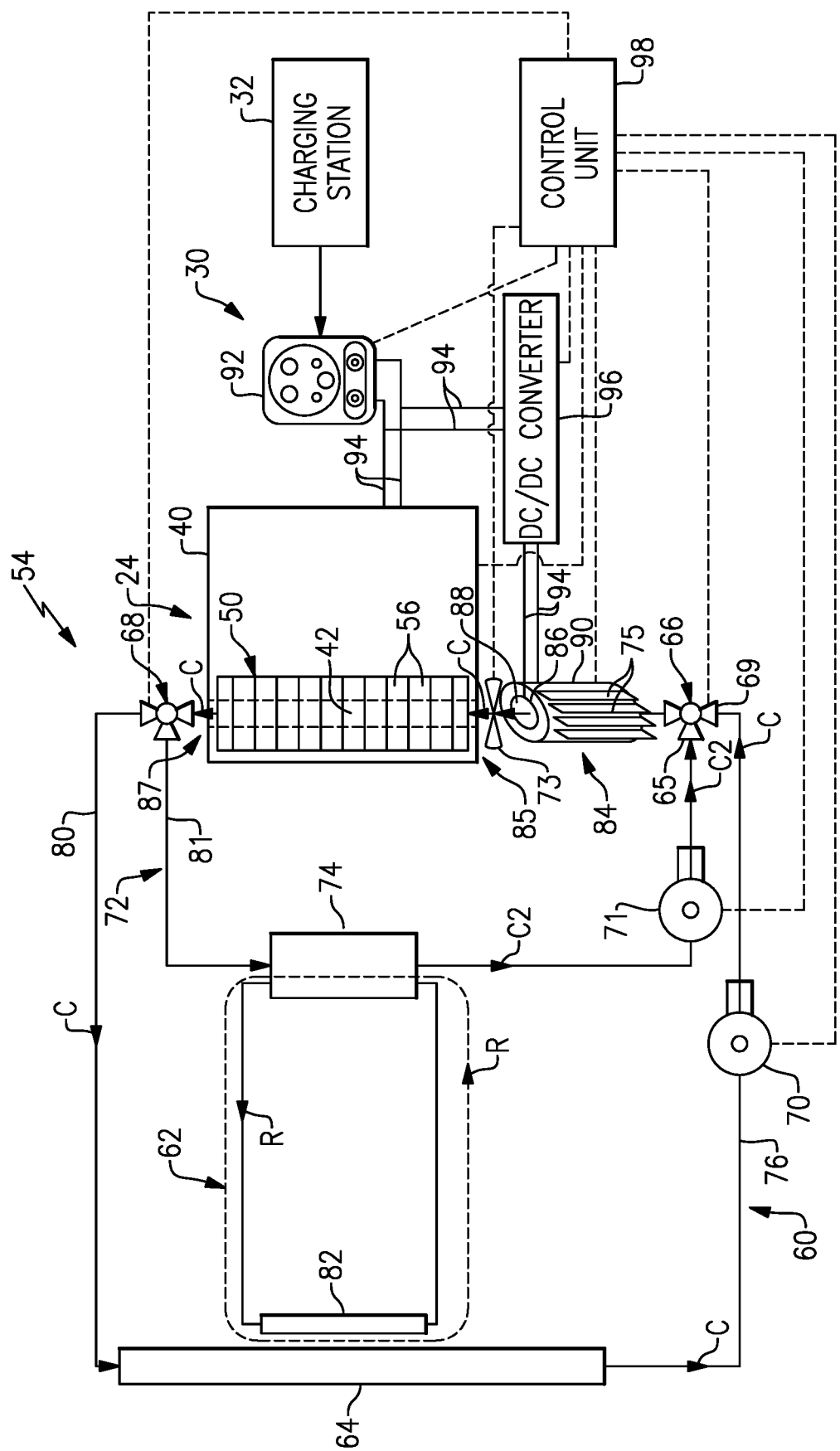
FIG. 3 schematically illustrates a battery thermal management system of an electrified vehicle.

FIG. 3 schematically illustrates a battery thermal management system 54 employable to manage the thermal load generated by the battery cells 56 of the battery pack 24. In one non-limiting embodiment, the battery thermal management system 54 selectively communicates a coolant C through the battery pack 24 to cool the battery pack 24 by removing heat from the battery cells 56. The coolant C is circulated through the internal cooling circuit 42 of the heat exchanger plate 40 to remove heat from the battery cells 56, in one non-limiting embodiment.

The battery thermal management system 54 of this non-limiting embodiment includes a coolant subsystem 60 and a refrigerant subsystem 62. The coolant subsystem 60 is shown in solid lines and the refrigerant subsystem 62 is shown in dashed lines. These systems are described in greater detail below.

The coolant subsystem 60, or coolant loop, circulates the coolant C, such as water mixed with ethylene glycol or any other suitable coolant, to thermally manage the battery pack 24. In one non-limiting embodiment, the coolant subsystem 60 includes a radiator 64, a first valve 66, a second valve 68, a pump 70, and a chiller loop 72 that includes a chiller 74. Although not specifically shown, the various components of the coolant subsystem 60 can be fluidly interconnected by conduits or passages such as tubes, hoses, pipes, etc.

During operation of the coolant subsystem 60, thermal energy is transferred from the coolant C to ambient air outside the vehicle within the radiator 64. The pump 70 communicates the coolant C that has been cooled within the radiator 64 to the first valve 66 within line 76. In one non-limiting embodiment, the first valve 66 is a three-way valve, although other valves are also contemplated. The coolant C may be communicated to a port 69 of the first valve 66. The first valve 66 is positioned upstream from the battery pack 24 to control the flow of the coolant C into and then through the battery pack 24. The coolant C is communicated through the internal cooling circuit 42 of the heat exchanger plate 40 inside the battery pack 24, in one non-limiting embodiment.

The second valve 68, which may also be a three-way valve, is located downstream from the battery pack 24. The second valve 68 controls the flow of coolant C exiting the battery pack 24 into either a line 80, which returns the coolant C to the radiator 64, or a line 81 of the chiller loop 72. Coolant C that enters the chiller loop 72 is communicated through the chiller 74 where it exchanges heat with refrigerant R of the refrigerant subsystem 62. In other words, the chiller 74 facilitates the transfer of thermal energy between the chiller loop 72 and the refrigerant subsystem 62.

The vehicle could be operating in an extremely hot environment in which the radiator 64 is unable to transfer sufficient thermal energy from the coolant C to ambient air. Therefore, the chiller loop 72 can be employed to increase the cooling. For example, the chiller loop 72 can deliver another portion C2 of the coolant C to cool the battery pack 24. The coolant C is chilled in the chiller 74 to provide the portion C2. The portion C2 of the coolant C is communicated to another port 65 of the first valve 66. The ports 65, 69 of the first valve 66 can be selectively controlled (i.e., opened and closed) to deliver coolant C of a desired temperature to the battery pack 24. A pump 71 may be used to circulate the coolant C through the chiller loop 72.

The refrigerant subsystem 62, or refrigerant loop, circulates refrigerant R to transfer thermal energy to or from a passenger cabin (not shown) of the vehicle and/or to or from the chiller loop 72. The refrigerant subsystem 62 may be part of a main vehicle cooling system that is configured to deliver conditioned airflow to a passenger cabin. Although not specifically shown, the various components of the refrigerant subsystem 62 can be fluidly interconnected by conduits or passages such as tubes, hoses, pipes, etc.

In one non-limiting embodiment, the refrigerant subsystem 62 includes a condenser 82. The chiller 74 of the chiller loop 72 is also in fluid communication with the refrigerant subsystem 62. In this way, the chiller 74 is part of both the chiller loop 72 and the refrigerant subsystem 62.

During operation of the refrigerant subsystem 62, the refrigerant R is circulated in a closed loop through the condenser 82 and the chiller 74. The condenser 82 transfers heat to the surrounding environment by condensing the refrigerant R from a vapor to a liquid. The liquid refrigerant R exiting the condenser 82 is communicated through the chiller 74 where it exchanges heat with the coolant C of the coolant subsystem 60.

The battery thermal management system 54 additionally includes a thermoelectric device 84. The thermoelectric device 84 is selectively actuated to further augment (i.e., supplement) cooling of the battery pack 24, such as during situations where the chiller loop 72 alone is unable to meet the cooling demands of the battery pack 24.

In one non-limiting embodiment, the thermoelectric device 84 is positioned upstream from an inlet 85 of the battery pack 24. In another non-limiting embodiment, the thermoelectric device 84 is positioned downstream from an outlet 87 of the battery pack 24. As shown in FIG. 3, the thermoelectric device 84 can be disposed as part of the coolant subsystem 60 between the first valve 66 and the inlet 85 of the battery pack 24. The location of the thermoelectric device 84 is design specific and therefore is not intended to limit this disclosure.

In one non-limiting embodiment, the thermoelectric device is a Peltier device. A DC current is passed through a junction 86 of the thermoelectric device 84. The junction 86 is positioned between a cold side 88 and a hot side 90 of the thermoelectric device 84. As current flows through the junction 86, the cold side 88 is cooled and the hot side 90 is heated. The cold side 88 is exposed to the coolant C, and as the coolant C moves through the cold side 88 of the thermoelectric device 84, the coolant C is cooled to a temperature appropriate for cooling the battery pack 24. A fan 73 can be used to blow air across fins 75 of the hot side 90 to remove additional heat. The thermoelectric device 84 can therefore augment the cooling supplied by the chiller loop 72, particularly at relatively high ambient temperatures and relatively extreme thermal load conditions.

A charging port 92 of the charging system 30 receives and distributes power received from the charging station 32. In one non-limiting embodiment, the charging station 32 is a DC fast charging station and the charging port 92, which is located on-board the vehicle, is an SAE combo port. A portion of the power received from the charging station 32 is distributed to charge the battery cells 56 of the battery pack 24. Another portion of the power may be communicated to power the thermoelectric device 84. The power is communicated over high voltage wires 94 (one positive (+) wire and one negative (−) wire). A DC/DC converter 96 may optionally be used to supply lower voltage power to the thermoelectric device 84. In other words, the DC/DC converter 96 is configured to step down high voltage DC to a lower voltage DC.

A control unit 98 is configured to control operation of the battery thermal management system 54 for thermally managing the battery pack 24. The control unit 98 could be part of an overall vehicle control unit, such as a vehicle system controller (VSC), or could alternatively be a stand-alone control unit separate from the VSC, such as a battery control module. In one non-limiting embodiment, the control unit 98 includes executable instructions for interfacing with and operating the various components of the battery thermal management system 54. The control unit 98 includes various inputs and outputs for interfacing with the various components of the battery thermal management system 54, including but not limited to the battery pack 24, the first valve 66, the second valve 68, the pump 70, the thermoelectric device 84, the fan 73, the charging port 92 and the DC/DC converter 96. The control unit 98 additionally includes a processing unit and non-transitory memory for executing the various control strategies and modes of the battery thermal management system 54.

Figure 4:
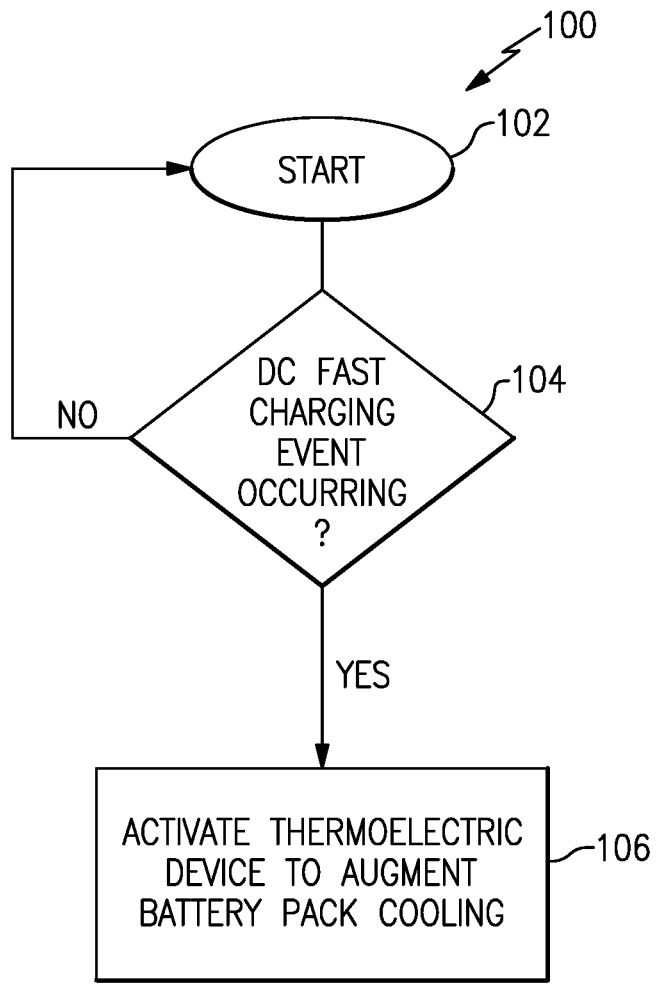
FIG. 4 schematically illustrates an exemplary control strategy for thermally managing a battery pack of an electrified vehicle according to a first embodiment of this disclosure.

FIG. 4, with continued reference to FIGS. 1-3, schematically illustrates a control strategy 100 for controlling the battery thermal management system 54 of the electrified vehicle 12. For example, the control strategy 100 can be executed to thermally manage the heat generated inside the battery pack 24. In one non-limiting embodiment, the control unit 98 is programmed with one or more algorithms adapted to execute the exemplary control strategy 100, or any other control strategy. In another non-limiting embodiment, the control strategy 100 is stored as executable instructions (e.g., as software code) in the memory of the control unit 98.

The control strategy 100 begins at block 102. At block 104, the control unit 98 determines whether a DC fast charging event is occurring. In one non-limiting embodiment, the control unit 98 monitors the charging port 92 of the charging system 30 to determine whether high voltage DC power is being communicated from an external power source. If a DC fast charging event is not occurring, the control strategy 100 returns to block 102.

Alternatively, if a DC fast charging event has been inferred at block 104, the thermoelectric device 84 is actuated (i.e., turned ON) at block 106 to augment cooling of the battery pack 24. In one non-limiting embodiment, the control unit 98 commands the DC/DC converter 96 to communicate high voltage DC (over wires 94) for powering the thermoelectric device 84 during DC fast charging events. Once the thermoelectric device 84 has been activated, coolant C that moves through the cold side 88 of the thermoelectric device 84 is cooled to a temperature appropriate for cooling the battery pack 24 during the DC fast charging event, which can cause a significant amount of heat generation by the battery cells 56. The control unit 98 can also selectively command operation of the fan 73 to remove additional heat from the coolant C as it passes through the thermoelectric device 84.

In another non-limiting embodiment, operation of the thermoelectric device 84 continues even after the DC fast charging event ends, or once the battery pack 24 is fully charged, to continue to chill the battery pack 24. For example, continued operation of the thermoelectric device 84 may be desired during relatively high ambient temperatures. The control unit 98 is configured to control operation of the thermoelectric device 84, including when to turn the device ON and when to turn the device OFF. The control unit 98, or a separate control unit, may control whether the radiator 64, the chiller 74 or the thermoelectric device 84 is used after charging.

In yet another non-limiting embodiment, the amount of heat removed from the coolant C at any point in time during the DC fast charging event can be modified (i.e., increased or decreased) by controlling the thermoelectric device 84. For example, a greater amount of heat can be removed from the coolant C by communicating a higher current to the thermoelectric device 84, whereas less heat can be removed by communicating a lower current to the thermoelectric device 84. The control unit 98 is therefore further configured to modify the input voltage/current communicated to the thermoelectric device 84 from the charging port 92.

Figure 5:
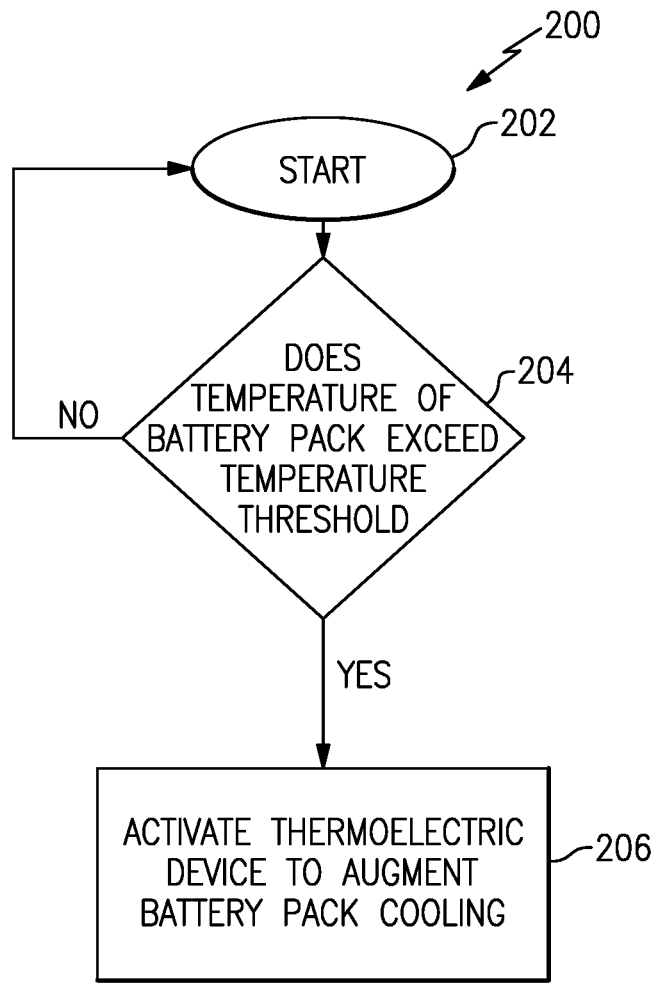
FIG. 5 schematically illustrates an exemplary control strategy for thermally managing a battery pack of an electrified vehicle according to a second embodiment of this disclosure.

FIG. 5 illustrates another exemplary control strategy 200 for controlling the battery thermal management system 54 to thermally manage heat generated by the battery cells 56 of the battery pack 24. The control strategy 200 begins at block 202. Next, at block 204, the control strategy 200 determines whether a temperature of the battery pack 24 exceeds a temperature threshold. The temperature threshold is a temperature value stored in the memory of the control unit 98. If the temperature of the battery pack 24 exceeds the temperature threshold, which could occur during DC fast charging events or other high heat load conditions, the coolant subsystem 60 is determined to be at maximum capacity and thus additional cooling is necessary to chill the battery pack 24 to an appropriate level. In one non-limiting embodiment, the control unit 98 (with the aid of various sensors or other monitoring devices) monitors the temperature of the battery cells of the battery pack 24 at both the inlet 85 and the outlet 87 and compares these temperatures to the temperature threshold to determine whether more cooling is required. The thermoelectric device 84 is activated at block 206 to augment cooling of the battery pack 24 if the temperature of the battery pack 24 exceeds the temperature threshold at block 204.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery thermal management system, comprising:
a passenger cabin;
a refrigerant subsystem configured to transfer thermal energy to or from said passenger cabin;
a battery pack;
a coolant subsystem configured to cool said battery pack, wherein a coolant of said coolant subsystem exchanges heat with a refrigerant of said refrigerant subsystem within a chiller that is part of both said refrigerant subsystem and said coolant subsystem; and
a thermoelectric device disposed within said coolant subsystem and selectively activated to augment cooling of said battery pack,
wherein said thermoelectric device and said battery pack are disposed within a common coolant line of said coolant subsystem.

2. The system as recited in claim 1, wherein said coolant subsystem includes a radiator, a first valve, a second valve, and a chiller loop that includes said chiller, said coolant subsystem configured to circulate said coolant through an internal cooling circuit of said battery pack to remove heat generated by battery cells of said battery pack.

3. The system as recited in claim 1, wherein said refrigerant subsystem includes a condenser.

4. The system as recited in claim 1, wherein said coolant subsystem includes a pump configured to circulate said coolant through said coolant subsystem.

5. The system as recited in claim 1, wherein said thermoelectric device is a Peltier device.

6. The system as recited in claim 1, wherein said thermoelectric device includes a junction positioned between a cold side and a hot side, said cold side exposed to said coolant of said coolant subsystem to remove heat from said coolant.

7. The system as recited in claim 1, wherein said thermoelectric device is powered by a charging port of a charging system.

8. The system as recited in claim 7, comprising a DC/DC converter between said charging port and said thermoelectric device.

9. The system as recited in claim 7, wherein said charging port is a combo port configured to distribute a direct current (DC) power simultaneously to both said battery pack and said thermoelectric device.

10. The system as recited in claim 1, comprising a control unit configured to activate said thermoelectric device during DC fast charging events, and further wherein, during said DC fast charging events, at least 50 amps of direct current are delivered for rapidly charging said battery pack.

11. The system as recited in claim 1, comprising a control unit configured to activate said thermoelectric device in response to a temperature of said battery pack exceeding a temperature threshold.

12. The system as recited in claim 1, wherein said thermoelectric device is positioned upstream from an inlet of said battery pack.

13. The system as recited in claim 1, wherein said thermoelectric device is positioned downstream from an outlet of said battery pack.

14. The system as recited in claim 1, comprising a fan configured to blow air across a plurality of fins of said thermoelectric device.

15. The system as recited in claim 1, wherein said thermoelectric device is positioned near an exit line of a chiller loop of said coolant subsystem.

16. The system as recited in claim 1, wherein said coolant subsystem includes a first three-way valve positioned upstream from said battery pack and configured to selectively direct a first portion of said coolant cooled by a radiator and a second portion of said coolant cooled by said chiller to an inlet of said battery pack, and further wherein said coolant subsystem includes a second three-way valve positioned downstream from said battery pack and configured to direct a third portion of said coolant exiting said battery pack to either said radiator or said chiller.

17. The system as recited in claim 1, wherein said thermoelectric device is positioned within said common coolant line at a location that is between a three-way valve of said coolant subsystem and an inlet of said battery pack.

18. A battery thermal management system, comprising:
a passenger cabin;
a refrigerant subsystem configured to thermally manage said passenger cabin;
a battery pack;
a coolant subsystem configured to thermally manage said battery pack,
wherein a coolant of said coolant subsystem exchanges heat with a refrigerant of said refrigerant subsystem within a chiller that is part of both said refrigerant subsystem and said coolant subsystem;
a thermoelectric device disposed within said coolant subsystem and selectively activated to augment cooling of said battery pack,
wherein said thermoelectric device is positioned within a common coolant line of said coolant subsystem at a location that is between a three-way valve of said coolant subsystem and an inlet of said battery pack,
wherein said three-way valve is located downstream from said chiller and upstream from an inlet of said battery pack; and
a charging port configured to distribute a direct current (DC) power simultaneously to both said battery pack and said thermoelectric device,
wherein a first portion of said DC power is communicated over a first set of high voltage wires from said charging port to said battery pack and a second portion of said DC power is communicated over a second set of high voltage wires from said charging port to said thermoelectric device.

* * * * *